INVENTORS
Herbert A. Bing
and
Philip Boone
BY Brown and Mikulka
ATTORNEYS

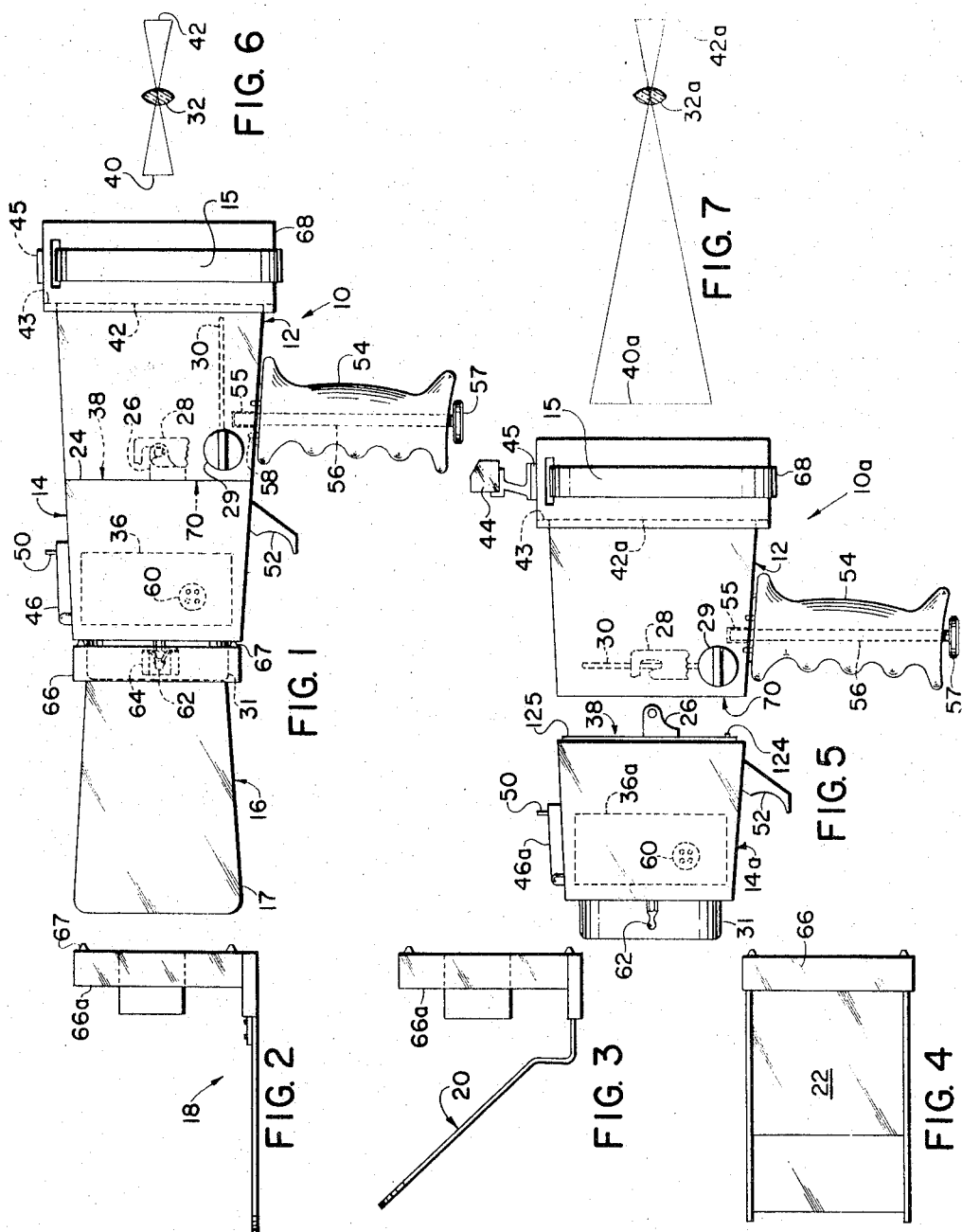

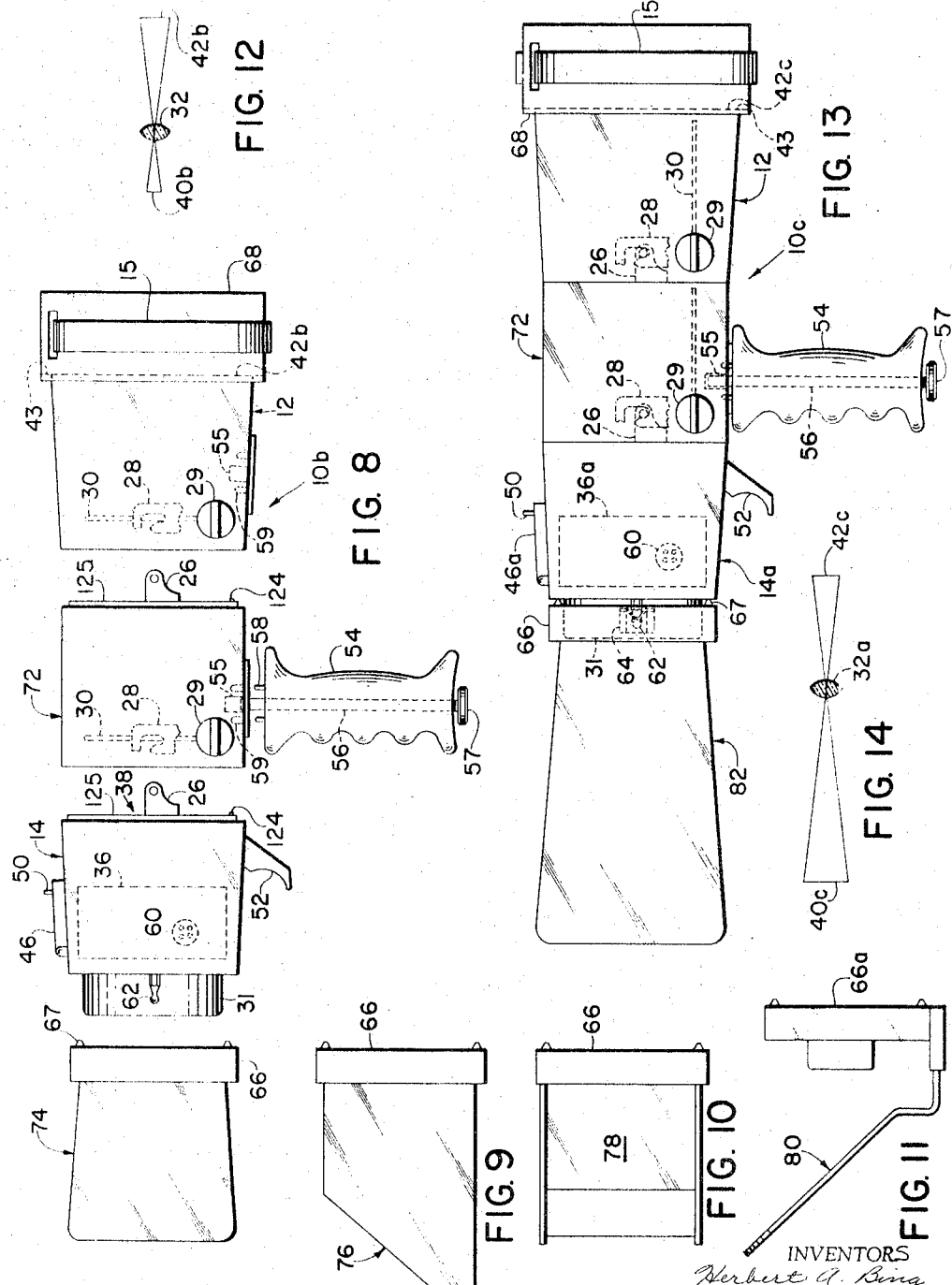

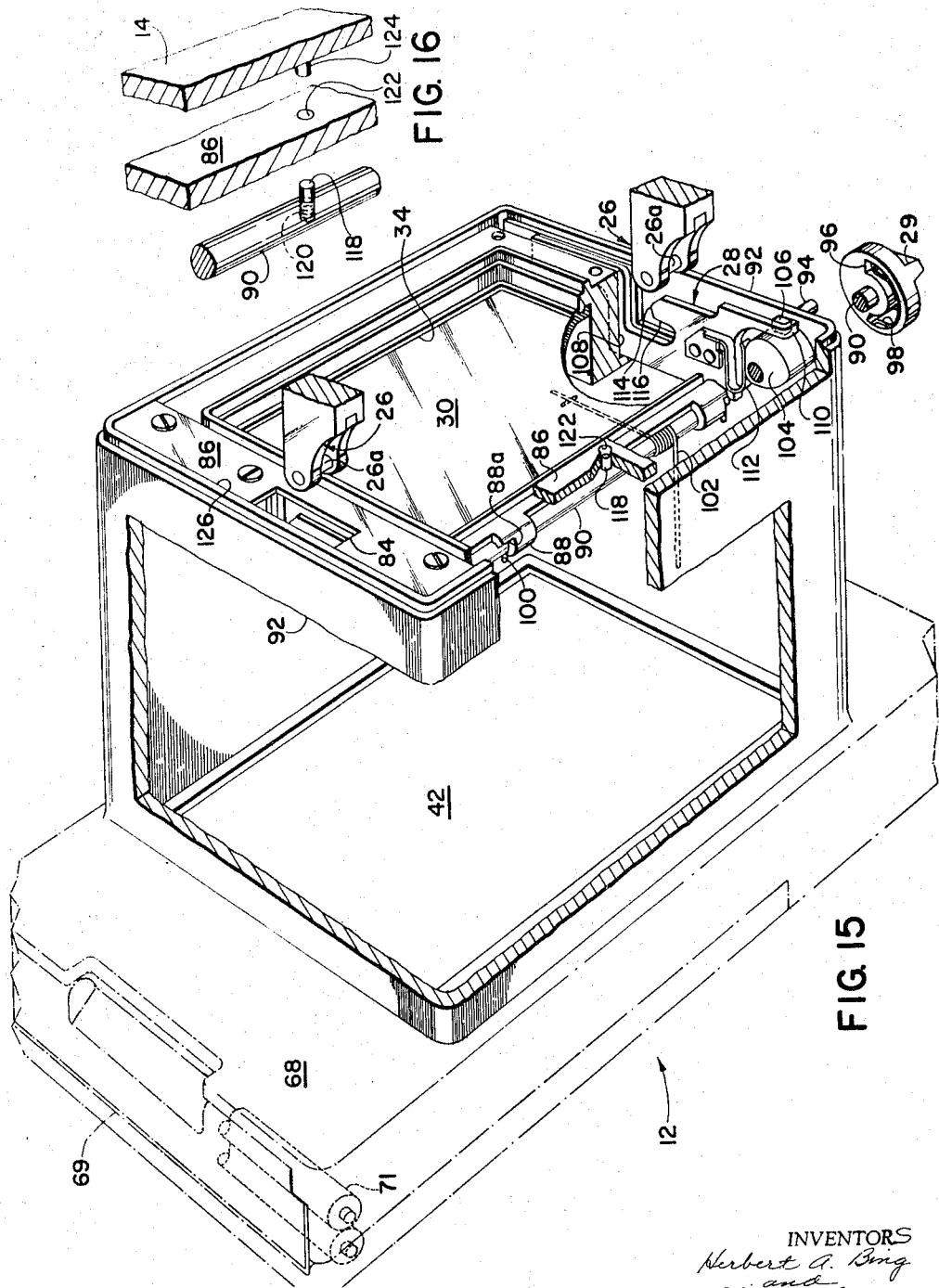

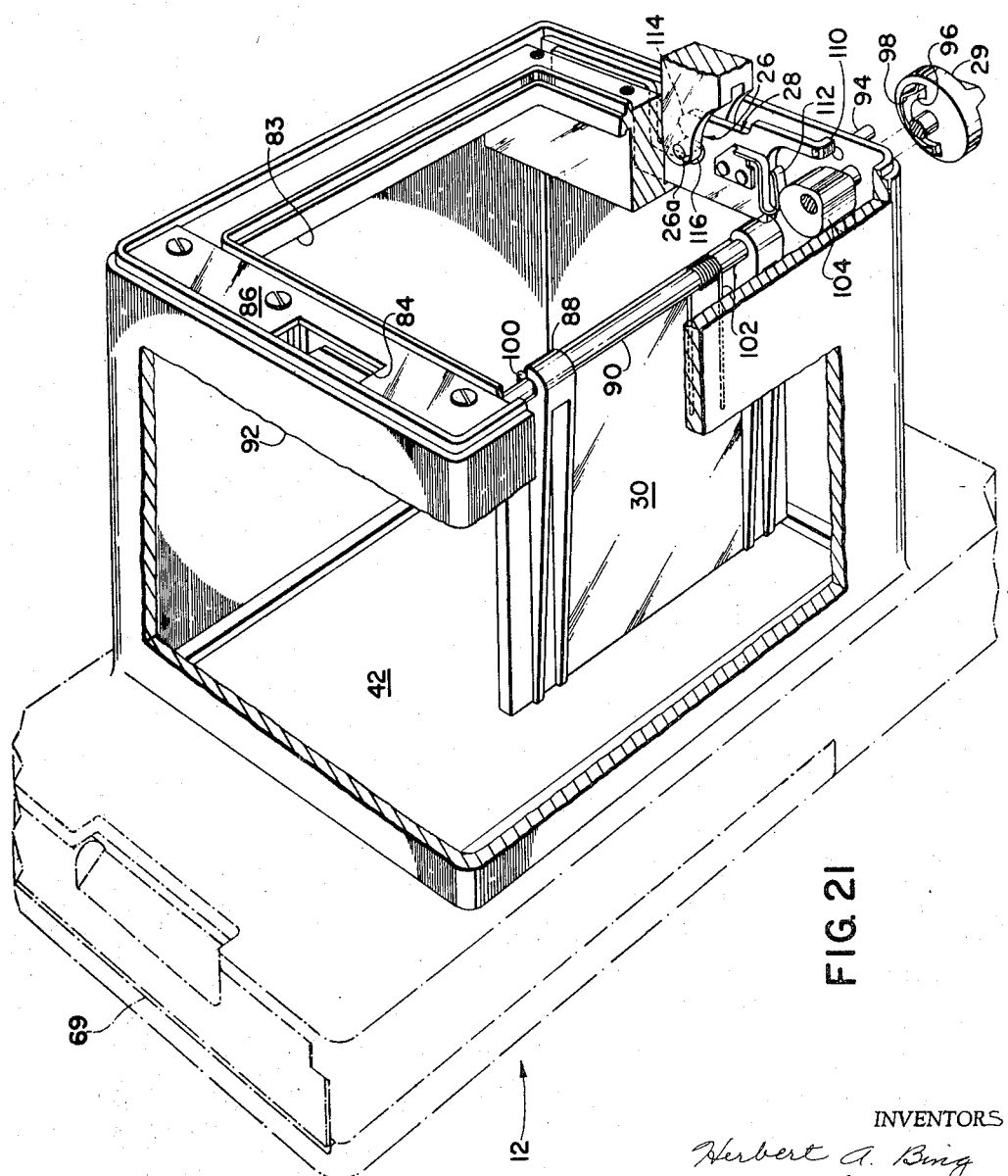

United States Patent Office 3,295,425
Patented Jan. 3, 1967

3,295,425
CAMERA APPARATUS
Herbert A. Bing, Wellesley, and Philip Boone, Winchester, Mass., assignors to Polaroid Corporation, Cambridge, Mass., a corporation of Delaware
Filed Dec. 30, 1964, Ser. No. 422,254
5 Claims. (Cl. 95—11)

This invention relates to a camera capable of rapidly producing finished photographic prints in black-and-white or color for use in the sphere of so-called "close-up" photography. More specifically, it concerns an improved camera of the character described for producing a wide variety of close-up photographs through rapid and easily-performed substitution of its basic components to make available a broad range of subject field sizes and magnifications, photosensitive materials being protected against inadvertent exposure throughout said substitution of components.

The camera of the present invention more specifically includes the self-processing feature of cameras manufactured by Polaroid Corporation of Cambridge, Massachusetts, U.S.A. As such, it is adapted to use film materials identified with these cameras and is capable of providing a completed black-and-white or full-color photographic print within a few seconds following a photographic exposure and without requiring any delay in making a subsequent exposure, processing being completed outside of the camera. The camera is extremely simple to operate, flexible in performance, and enables the taking of pictures of consistent quality, in rapid succession and at short range, of an extremely wide selection of subject matter, without the need of customary focus and exposure computations. It offers a choice of magnification and other subject-image ratios not usually obtainable in a single instrument, as permitted by various combinations of its interchangeable components. In this connection, the camera is particularly adapted to use in scientific fields including those of medicine, dentistry, the photographing of miniature mechanisms and machine parts, criminal investigation and identification, the examination of documents, philatelic and numismatic studies, and the like, that is, wherever it is of advantage to photographically inspect subject material at close range, to reproduce extremely fine detail and to obtain an immediate, accurate, visible photographic record.

In contrast to conventional close-range cameras which embody continuously-adjustable mechanisms and perhaps separate measuring means for establishing various lens-to-subject and lens-to-film-plane distances to achieve different magnifications, the present camera is an assembly composed of rapidly-interchangeable basic components or sections, each of which, in conjunction with an accompanying interrelated series of attachments or accessories, provides a given magnification or other size relation and a predetermined field of view without the need of complicated settings or adjustments. For any given assembly of the aforesaid components the usual variables of photography: light, focus and field size are held constant. Thus, time-consuming computations involving delays, perhaps inconsistent results and possible margins for error in making an exposure, where a slight miscalculation could result in a blurred image, an incorrect magnification, an incomplete field area, or some other deficiency, are effectively eliminated.

In accordance with the foregoing considerations, objects of the present invention are to provide a portable camera of the character described in which the different magnifications or other size ratios are obtainable in positive steps through the use of readily-mounted and rapidly-interchangeable housing sections or components involving lens and other options, thus eliminating time-consuming adjustments and the possibility of erroneous settings; to provide a short-range or close-up camera in which latching and movable interlocking opaque screen or baffle means of the aforesaid sections permit their being interchanged in a lighted environment while protecting an uncovered photosensitive emulsion at the film plane against inadvertent exposure; to provide a camera of the aforesaid category in which the interchangeable housing sections are held in partial or preliminary engagement merely by bringing them into juxtaposition and are finally engaged by manual actuation of the latching means; and to provide a supplemental latching means for preventing any possibility of removal of the baffle from its film-protective position except when the housing sections are joined in light-tight relation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a diagrammatic side view of a camera assembly of the invention;

FIGS. 2, 3 and 4 are diagrammatic side views of accessories or attachments for incorporation with the camera assembly of FIGURE 1;

FIG. 5 is a diagrammatic side view of a modification of the camera assembly of FIGURE 1;

FIGS. 6 and 7 are optical diagrams relating to the camera assemblies of FIGS. 1 and 5, respectively;

FIG. 8 is a diagrammatic side view of another modification of the camera assembly;

FIGS. 9, 10 and 11 are diagrammatic side views of accessories or attachments for incorporation with the camera assembly of FIG. 8;

FIG. 12 is an optical diagram relating to the camera of FIG. 8;

FIG. 13 is a diagrammatic side view of a further modification of the camera assembly;

FIG. 14 is an optical diagram relating to the camera of FIG. 13;

FIG. 15 is a diagrammatic perspective view, partly in section and with parts broken away, of a cooperating latch and door mechanism of one section of the camera assembly of the invention;

FIG. 16 is an enlarged view of a portion of the mechanism of FIG. 15; and

FIGS. 17 through 21 are diagrammatic perspective views of the mechanism of FIG. 15 illustrating a sequence of operations thereof.

Figure 17:
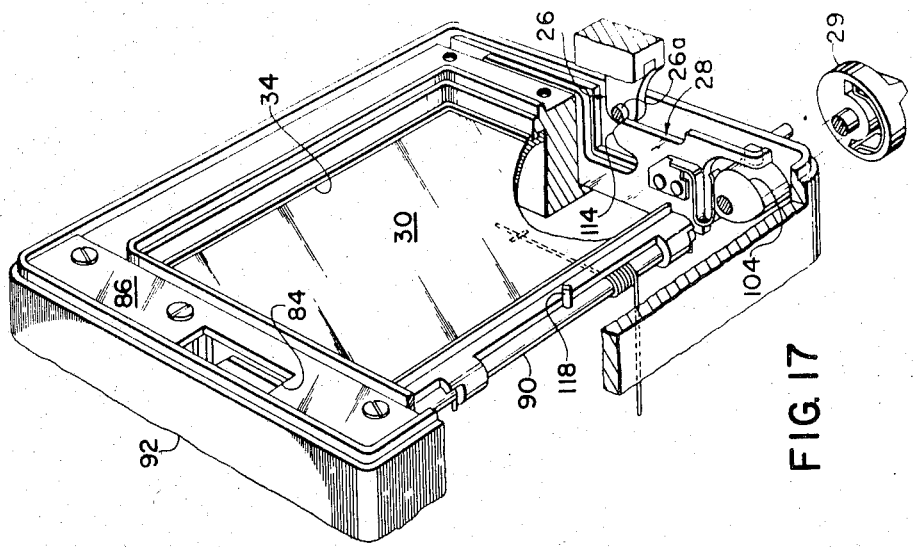

Referring now to FIGURE 1, the basic camera 10 of the invention is shown in side elevation. It is composed of a rear housing or section 12 adapted to contain photosensitive film material and a front housing or section 14 containing the lens and exposure mechanism, the two sections being adapted either to separation or joining together, manually. The terms "front" or "forward" and "rear" or "back" are used herein to denote proximity to or remoteness from the camera front or lens assembly. Each camera section is of a generally rectangular shape, tapers slightly from rear-to-front, and, basically, comprises a housing composed of a metal such as die-cast aluminum, within or upon which various elements of the camera are mounted. A carrying-strap 15 is provided. Accompanying the two-section assembly are the several accessories, or attachments, 16, 18, 20 and 22, releasably attachable to the front section 14, the accessory 16 being shown thus attached. The accessories are interchangeable components essential to the performance of various photographic functions to be more fully described below. In brief, the accessory 16 is a general-purpose element comprising a pair of laterally spaced, forwardly-extending, metallic plate-like elements 17 and a base or adapter 66 to which the elements 17 are attached. This accessory serves both in a spacing and supporting capacity and provides a distance of approximately 6 inches from lens to subject. The accessories 18 and 20 are primarily intended for intra-oral photography in the dental field at a similar distance. The accessory 22 is intended for direct photography, at approximately 6 inches, of fingerprints or other subject matter carried on a smooth, reflective surface wherein it is necessary to eliminate surface reflections which would impair contrast in the image. All of the accessories will be understood as having at least a spacing function, whether or not they possess an additional function. The camera assembly of FIGURE 1, with any of the aforesaid accessories, provides a 1:1 or life-size object-image relation.

An alternate front section 14a, having a lens of different optical characteristics, is provided for combination with the rear section 12 to produce the camera assembly 10a of FIG. 5. This combination provides a ¼:1, or quarter life-size image-to-object ratio. No front-attached accessories are shown for use with the camera assembly 10a although such accessories may be provided, as required.

The selected front section, 14 or 14a, as the case may be, is releasably joined to and locked with the rear section 12 along the joining line 24 by a pair of projecting, horizontally-disposed, clevis- or fork-like latch members 26 of the front section which are adapted to engage a pair of linearly movable, recessed, horizontally-disposed latch members 28 of the rear section 12. The latch members 28 are actuated by a knob 29 which, by means of interlocking mechanism, also operates a pivotal opaque baffle or door 30 serving as a closure for the substantially open front of the rear section 12. The baffle 30, including a light-sealing flange 34, is employed to protect photosensitive film materials carried by the rear section 12 against an unwanted entrance of light, whenever the front and rear sections are disassembled. Operation of the baffle 30 will be described in detail hereinafter. The combined front and rear sections provide a distance of approximately 6 inches from the lens to a photosensitive film material positioned for exposure at an image plane.

Each of the front sections, 14 or 14a, includes an identical electronic flash unit 31 producing an exposure flash of given intensity and duration as, for example, one of approximately 1/500 second duration, and contains a lens assembly 32 or 32a, respectively, an iris-type diaphragm and a between-the-lens shutter, not shown, the complete assembly of lens, diaphragm and shutter being indicated at 36 and 36a. The flash unit 31 is in the form of a built-in ring light surrounding the front of the lens aperture. While each lens assembly is shown, for simplicity, as a single element in the diagrams of FIGS. 6 and 7, it is, actually, a multicomponent element, e.g., a four-element lens. As incorporated with the front section 14 it is, for example, an f/4.5 to f/45 lens of 75 mm. (3-inch) focal length. As identified with the front section 14a it is an f/4.7 to f/45 lens of 127 mm. (5-inch) focal length. The complete lens-diaphragm-shutter assembly, designated 36 for the 3-inch lens in FIGURE 1 and 36a for the 5-inch lens in FIG. 5, may, for example, be of the type of a "Prontor Press" unit manufactured by Alfred Gauthier, G.m.b.H., Schwarzwald, Germany, incorporating a self-cocking shutter and a Tessar Type "Rodenstock Ysaron" copy lens. The shutter speeds are 1 second to 1/125 second and "Bulb"; "X" synchronization.

Leading rearwardly from the lens and shutter assembly, within either of the front sections 14 or 14a and terminating in an open rear face, is a chamber 38 which, in conjunction with the rear section 12, establishes a continuous passage and the aforementioned fixed distance of approximately 6 inches from the lens, namely, the 3-inch lens 32 or the 5-inch lens 32a, to the film plane at 42, the latter being established by film-positioning flange means 43. In the associated diagrams of FIGS. 6 and 7, the field area of the photographic subject is represented at 40 or 40a, respectively, and both the image plane and image there-formed are indicated at 42 and 42a, respectively. As previously intimated, the correct lens-to-subject distance of approximately 6 inches for the assembly 10 of FIG. 1 is determined by the dimensions of the accessories 16, 18, 20 and 22. The area or field of the subject to be photographed is ascertained by direct inspection. As previously indicated, no frontal accessory is illustrated for employment with the camera assembly 10a of FIG. 5, the enlarged field 40a being determined and a fixed distance of 31.3 inches between the subject and the film plane being established by the optics of the 25-inch viewfinder-rangefinder 44, releasably attached to an adapter or clip 45.

A pivotal door or cover, 46 or 46a, having a transverse slot 48 formed therein, is located at the top of each front section 14 or 14a, respectively. A lever 50 enabling semiautomatic operation extends upwardly through the slot. It permits a rapid and simplified setting of the diaphragm aperture to three positions consistent with a given established level of illumination and the different speed characteristics of black-and-white and color film, a constant shutter speed of 1/60 second being generally employed for either type of film during semi-automatic operation, as explained in detail below. At open position, the cover allows access to a separate diaphragm-adjusting lever integral with the pointer 130 and to the shutter-adjusting lever 51 thus making available a complete range of diaphragm and shutter settings if the operator so desires. A trigger-type shutter release 52 permits actuation of the self-cocking shutter. A contoured handle in the form of a pistol grip 54 is releasably attached to a threaded bore 55 of the rear section 12 by inserting therein a tap-bolt 56 having a knurled knob 57. Correct rotational position of the grip is insured by positioning the pins 58 of the grip in the recesses 59. The pistol grip provides an especially convenient method of holding the camera for certain methods of photography for which the camera is intended, such as that illustrated in FIG. 40. Moreover, it may serve as a holding or steadying means in withdrawing a film unit from the camera during processing. A recessed plug 60 is adapted to receive the socket of a cable from an A.C. power pack for energizing the electronic flash lamp. A supply of direct current may, alternatively, be provided. The protruding plug-like lugs or knobs 62 at either side of the flash unit 31 constitute fastener means adapted to engage mating socket-like fastener apertures or receptacles 64 of each adapter element 66 associated with the accessories. The protuberances 67 contribute to the proper mounting of each accessory on a front section of the camera by providing a firm and accurate seating of the accessory thereupon.

The rear section 12 includes a first chamber or compartment 68 suitable for receiving and mounting for photographic exposure a film pack comprising a plurality of film units, e.g., eight such units. These film units or assemblies are of a type adapted to produce completed prints through a diffusion transfer process when photographically exposed, subjected to compression to release a contained processing liquid, and withdrawn from the compartment 68 through a slot 69 (FIGS. 15 and 21) located on the end of the latter opposite to that at which the strap 15 is mounted. Film packs related to the type contemplated and capable of producing prints of approximately 3¼ x 4¼ inches in black-and-white or color are now commercially available and are described in U.S. Patent 3,080,805. The rear section 12 contains mechanism, illustrated by the pressure rolls 71 of FIG. 15, for applying the aforesaid compression to each film assembly to effect its processing following a photographic exposure, a generally similar mechanism being also described in U.S. Patent 3,080,805. A passage or second chamber 70, terminating in the aforementioned open front or face, leads forwardly from the image plane 42 at which each film unit is successively positioned for exposure.

In FIG. 8 there is shown an optional augmented assembly 10b of the subject camera for providing a 2× magnification of the photographic subject. It includes the previously-described rear section 12 and the front section 14, employed in the assembly of FIGURE 1 which includes the 3-inch lens. However, interposed between the sections 12 and 14 is an intermediate housing or section 72 which provides an overall lens-to-film plane distance of approximately 9 inches and which may be considered as a ratio multiplier. This augmented distance, in conjunction with the 3-inch lens of front section 14 and a reduced lens-to-object distance of about 4½ inches, provided by the shorter length of the accessories 74, 76, 78 and 80, produces the desired 2× magnification. It will be noted that the pistol grip 54 has been separated from engagement with the rear section 12, and is at a position for attachment to the intermediate section 72 by means of the tap-bolt 56 and threaded aperture 55. Repositioning of the pistol grip 54 serves two functions. It maintains the proper balance or weight distribution of the camera for most efficient operation. It maintains the correct spacing between the grip and the shutter-release trigger 52 to enable identical operation of the latter for either the short assembly of FIGS. 1 and 5 or the long assembly of FIGS. 8 and 13. The accessory 74 includes, in addition to the adapter 66, the forwardly-extending side elements 75 and a frontal transverse element 77 having an aperture 77a defining the field of the subject to be photographed. It is a general-purpose spacer providing the aforesaid distance of approximately 4½ inches from lens to subject and constitutes a complete support when the camera is positioned vertically on a level horizontal surface and a partial support when the camera is held horizontally against a vertical surface. The accessories 76, 78 and 80 serve footprint, fingerprint, and intra-oral dental photographic functions, respectively.

The intermediate section or housing 72 includes the slidable latch member 28, the actuating knob 29, and the door or baffle element 30, all similar to components previously described relative to the rear section. The section 72 is a hollow, rectangular element, open at both ends, providing an extended passage between the front and rear sections and, accordingly, an increase in distance between the lens and film plane essential to the 2× magnification. The optical operation of the camera assembly 10b, assuming its components to be joined together, is illustrated in the diagram of FIG. 12. The less-distant subject area, of reduced dimensions, is designated 40b and the more-distant image plane and image, there formed, is located at 42b.

An assembly of the camera components 10c providing an 0.85:1 ratio of image-to-subject area is shown in FIG. 13. It comprises the rear section 12, the front section 14a embodying the 5-inch lens, the intermediate section 72, above described, and the spacer accessory 82 releasably attached to the front section 14a in the manner of the aforementioned accessories. The pistol grip 54 is attached to the intermediate section. The spacer element 82, structurally similar to the element 16 but approximately 8 inches in length, enables a somewhat larger ratio of image-to-subject area than the ¼:1 ratio, previously described. Furthermore, it serves as a stable mounting or positioning means, in a manner similar to that of the accessories 16 and 74. The assembly of FIG. 13 provides the 0.85:1 ratio of image-to-subject through the instrumentality of a lens-to-film plane distance of approximately 9 inches, the 5-inch lens of its front section 14a and the aforesaid distance of 8 inches from lens-to-subject area. The optical performance of the assembly of FIG. 13 is shown, diagrammatically, in FIG. 14, wherein the field area of the subject is designated 40c, the 5-inch lens assembly 32a, and the image plane and image 42c.

It will be understood from the foregoing description and figures that in the camera assemblies of FIGS. 1 and 5, as provided by the two-sectional structure thereof, the distances from lens-to-image plane are substantially identical, although very slightly greater in that of FIG. 5, because of a more forward location of a principal plane or point of the 5-inch lens assembly. Similarly, in the assemblies of FIGS. 8 and 13, as provided by the three-sectional camera structure, the distances from lens-to-image plane are also substantially identical excepting for the slightly greater length for the 5-inch lens assembly but, obviously, greater than those of FIGS. 1 and 5. The aforementioned small differences of distance due to differences of a principal plane in the optical system are so slight, e.g., ¼-inch or less, as not to be apparent in the diagrams of FIGS. 6, 7, 12 and 14. In resumé, it will be apparent that these distances are achieved in conjunction with two interchangeable front sections mounting lens assemblies of 3-inch and 5-inch focal length, and with interchangeable accessories determining the three lens-to-subject distances provided by the camera assemblies of FIGS. 1, 8 and 13, with accessories, and indicated in FIGS. 6, 12 and 14. The lens-to-subject distance of FIG. 7 is determined by the rangefinder 44, the optics of which are adjusted to this distance. In every instance, it will be noted that the images at the film plane are dimensionally similar, that is, they completely fill the frame of exposed film. The image-to-subject-area ratio or magnification is chosen in accordance with the area and visible detail of the subject material which it is desired to reproduce. In each of the described camera structures an optical axis of the lens assembly may appropriately be regarded as extending centrally and longitudinally of the assembled sections, and as being projected forwardly to the object being photographed.

Referring to FIGS. 15 through 21, a cooperating latch and baffle mechanism, which releasably holds the several camera sections together and operates the protective door or baffle 30, is shown in detail and at successive operational positions. As previously intimated, the baffle 30 is at open position only when the camera sections 12, 14, 14a and 72 are in assembled relation. The shutter then controls the film exposure. The baffle 30 is automatically brought to closed position, firmly seated against the frame 83, whenever the camera sections are disassembled. In this manner a photosensitive film, positioned at the image plane 42, is always protected against an inadvertent exposure when the sections are separated in the course of preparing to take a picture requiring a different ratio or magnification.

In FIG. 15, the latch and baffle mechanism is shown mounted in frontal portions of a rear housing section 12, it being understood, as indicated in FIGS. 8 and 13, that an identical mechanism is also incorporated in the intermediate section 72. The two latch members 26, fixed to and projecting rearwardly from a front or an intermediate section 14 or 72, as the case may be, which is about to be joined to the rear section 12, are shown in the process of entering apertures 84 formed in the frontal framing plate assembly 86 of the rear section. The baffle 30, illustrated at closed position, is rotatably mounted on the shaft 90 by the unitary projecting perforated lugs or appendages 88, the shaft 90, in turn, being rotatably mounted in bearing means identified with the side walls 92 of the rear section. One end of the shaft 90 extends through the far side wall 92. The actuating knob 29 is fixedly attached to the extremity of the shaft. A fixed pin 94 extends outwardly from the side wall 92 and a circular slot 96 describing an arc of slightly more than 180° is formed in the inner surface of knob 29. When the knob is turned, the ends of the slot 96 are ultimately brought into contact with the pin 94 and thus limit the rotation of the knob in either direction. A curved flat spring 98, mounted within the slot and terminating in outwardly-bent extremities, short of the ends of the latter, provides, with the pin 94, detent means such that a recognizable "click" occurs at the extremes of clockwise or counterclockwise rotation of the knob, the knob being releasably held between the bent ends of the spring and slot at these limits of rotation.

Each of the lugs 88, serving as bearing means for movement of the baffle 30, includes a cut-away section 88a. Two pins 100 are fixed to and extend radially outwardly from the shaft 90. The pins are free to undergo an unimpeded rotation of approximately 90° by reason of the cut-away portions 88a of the lugs 88. After being rotated into contact with the edge of each cut-away portion 88a through a 90° turning of the shaft 90 in response to rotation of knob 29, further rotation of shaft 90 and pins 100 causes pivotal movement of the lugs and the baffle 30, integral therewith. The door 30 is biased toward the closed position, illustrated, by the torsion spring 102. A cam 104, having a surface or segment of major radius extending through approximately 90° or one-quarter of its periphery, with a pin 106 projecting from one end of the aforesaid surface, is fixed to the shaft 90 adjacent to each of its ends and rotates therewith.

One latch mechanism only, located at one side of the rear section 12, is shown in the drawings, it being understood that an identical mechanism is located at the opposite side, underlying the framing plate 86 adjacent to the aperture 84. The latch member 28 is slidably mounted for linear movement in a channel 108. A hooked projection 110 of the latch releasably engages the pin 106 of cam 104. A U-shaped flat spring 112 is fastened to an end of each latch member 28 and constitutes a resilient cam-follower subject to be contacted by the cam 104. Each latch element 28 includes a tapered extremity 114, adapted to be contacted by the cross-bar 26a of the complementary clevis-type latch element 26 of the section which is to be joined. The latch element 28 also includes the undercut area or slot 116.

Completing the latch mechanism is a supplemental latching means or detent assembly comprising a movable, plunger-type pin 118, biased radially outwardly from the shaft 90 by the compression spring 120, and the aperture or perforation 122, formed in the lower member of the frontal framing plate assembly 86 and adapted to receive the pin 118 when brought into alignment therewith. The mechanism is shown in greater detail in FIG. 16. A fixed pin 124 projecting from the rear face of the section to be joined, e.g., the front section 14, is caused to be inserted in the aperture 122 from the opposite side when the two sections are completely joined together thus forcing the pin 118 out of the aperture 122. When the spring-biased pin 118 is in the aperture 122, the shaft 90 is held against rotation. When the pin 118 is removed from the aperture, the shaft 90 is free to rotate.

In FIG. 17, the cross-bar 26a of the latch element 26 is just commencing contact with a first inclined or angular surface of the tapered extremity 114 of the latch element 28.

Figure 18:
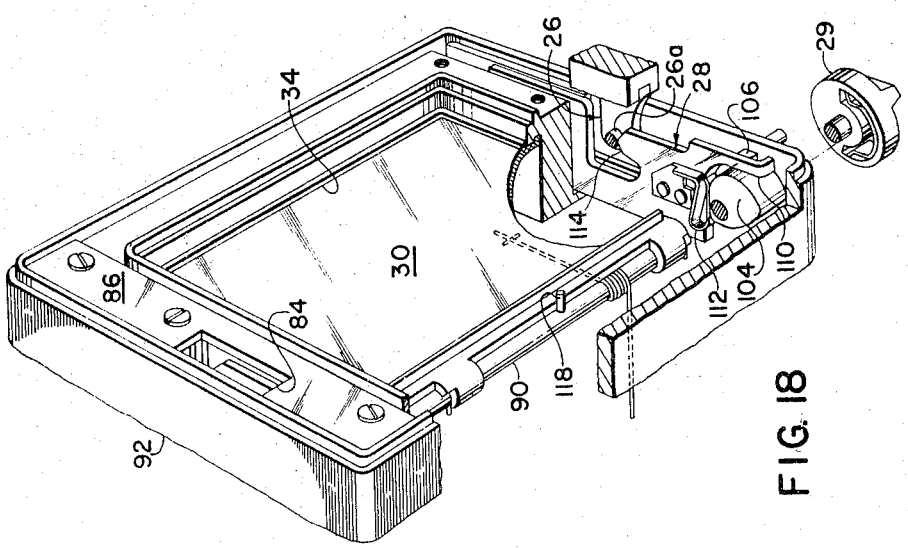

In FIG. 18, the cross-bar 26a is in contact with the tip of the tapered extremity 114 and has forced the latch 28 downwardly, as permitted by the compressibility of the spring-like cam-follower 112. It is to be noted that the hooked latch member 110 has been withdrawn from the cam pin 106.

Figure 19:
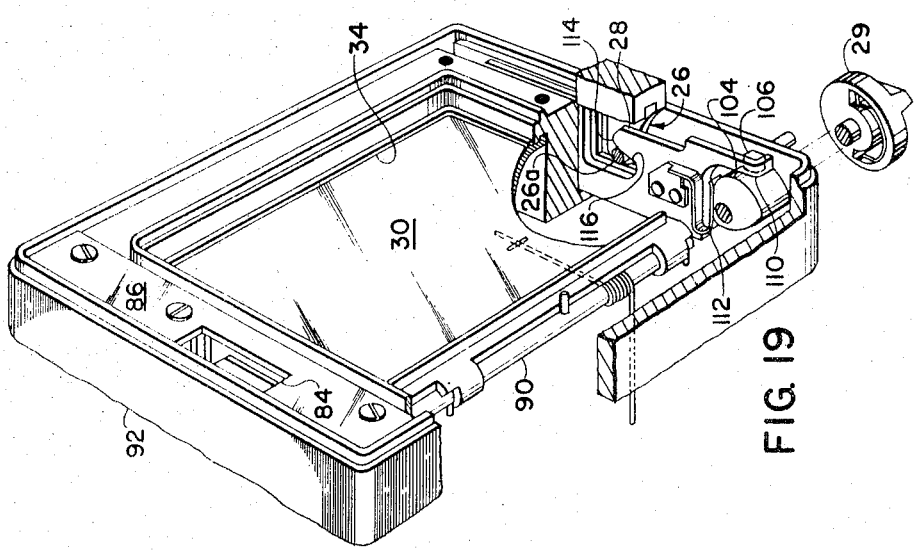

As shown in FIG. 19, a further insertion of the latch members 26 has brought the cross-bar 26a to a location in contact with the second, oppositely-angled surface of the tapered extremity 114 of the latch element 28 and is in readiness to enter the notch or slot 116. Accordingly, the latch 28 has been caused to slide upwardly, responsive to the bias of the compressed cam follower 112. The two camera sections are now somewhat loosely held together. The hooked latch member 110 has been returned to contact with the cam pin 106. At this juncture the fixed pin 124 of a front or intermediate section, as the case may be, has forced the movable pin 118 out of the aperture 122, thus permitting the shaft 90 to undergo rotation.

Figure 20:
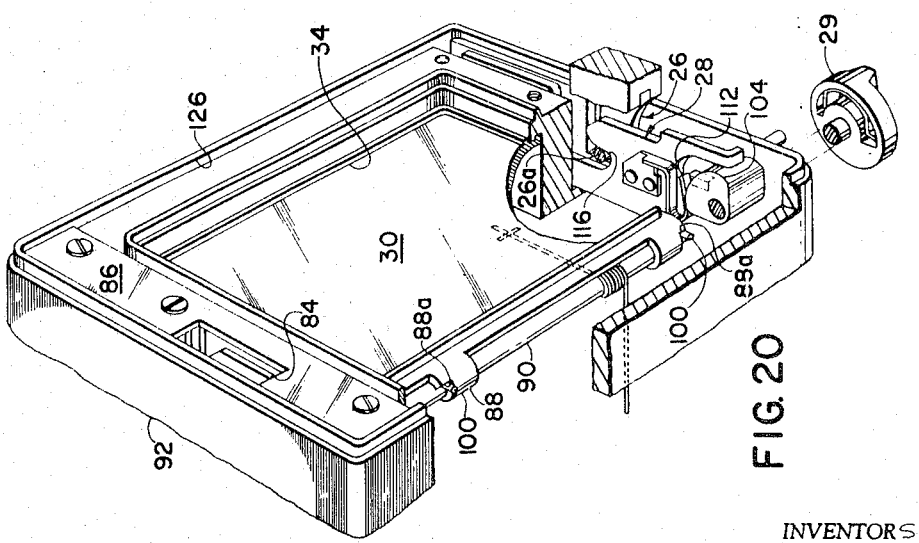

In FIG. 20, the knob 29 and shaft 90 have been rotated 90° in a clockwise direction, assuming one is facing the knob 29. The cam 104, including the cam pin 106, has, of course, been similarly rotated, thus bringing its surface of major radius into contact with the spring-like cam-follower 112. The latter is again compressed and to a degree such that it forces the latch element 28 to move upwardly. Accordingly, the cross-bar 26a of the latch 26 is brought to a location well within the notch 116 and the two camera sections are completely joined, the flanged edges 125 and 126 of the respective sections mating to provide a light-tight seal. The pins 100 have, meanwhile, been so rotated as to contact the edges of the cut-out lug portions 88a and are in readiness to cause a pivotal opening movement of the door or baffle 30.

FIG. 21 illustrates the position of elements of the latch and baffle mechanism existing when the limit of clockwise rotation of the knob 29, namely, a total rotation of slightly more than 180° has been reached, as determined by contact of the end of the slot 96 and the click spring 98 with the pin 94. The baffle 30 has been swung to open position, through continued rotation of the pins 100, bearing against the cut-away edges 88a of the door lugs. Accordingly, a clear passage is provided to the film plane 42 and the section 12 is in readiness for performing a photographic exposure. During this operation, the torsion spring 102 has been increasingly tensioned. Cam 104 has been permitted to rotate freely, in contact with the resilient spring 112, the latter having a predetermined resiliency maintaining the bias which previously moved the latch element 28 to holding relation with respect to the latch element 26.

Return of the baffle 30 to closed position, followed immediately by release of the latching mechanism, is accomplished by turning the knob 29 180° in an opposite or counterclockwise direction to the limit permitted by the slot 96 and pin 94. The baffle 30 is thus returned, so as to be firmly seated against the frame 83 under the bias of torsion spring 102 and as allowed by the rotation of the pins 100 to their original position. The pin 106, projecting from cam 104, is rotated to engagement with the hooked extremity 110 of latch 28. The latter is carried downwardly by the pin 106 causing the withdrawal of the overlying tapered extremity 114 of the latch from the cross-bar 26a. The camera section identified with the latches 26 is thereby released from joined relation with the rear section 12. Accompanying the foregoing operations leading to separation of two camera sections, the pin 118 of shaft 90 has been returned to alignment with the aperture 122 of framing plate 86 and, under bias of the spring 120, has entered this aperture, the latter, of course, being of slightly greater diameter than that of the pin 118 as well as that of the pin 124. Accordingly, the baffle 30 is locked at closed position and cannot be opened when either the back section 12 or an intermeriate section 72 has been separated from another camera section, except by the insertion of a probe in the aperture 122 or by the re-attachment of a camera section and the insertion of the pin 124. Thus, any danger of the knob 29 of a disassembled rear section or of an intermediate section, combined therewith, being accidentally turned is completely avoided.

Since certain changes may be made in the above apparatus without departing from the scope of the invention herein involved, it is intended that all matter contained in the above description or shown in the accompanying draw-

What is claimed is:

1. A camera embodying a plurality of interchangeable components for photographing, with extreme accuracy of focus and exposure, a wide variety of objects at short range in a minute detail at a predetermined magnification or other given dimensional ratio of like image and object portions, comprising a rear housing section adapted to carry a photosensitive film material and position it for exposure at a focal plane, at least one housing section releasably attachable to and adapted to be positioned forwardly of said rear section, a lens, exposure mechanism and actuating means therefor incorporated with at least one of said sections, means releasably attachable to a given section providing a given spacing between said lens and object to be photographed, and manually-operable, coacting, movable latching and film-protective means incorporated with and predeterminedly distributed between said sections for assembly and disassembly thereof and for providing protection of a film material located at said image plane from inadvertent exposure during said disassembly, said latching and film-protective means comprising a plurality of engageable fixed clevis-type latch members including a cross-bar mounted on one of said sections, and a plurality of engaging, movable latch members cooperating with a movable baffle through manually-actuable means interlocking said movable latch members and baffle mounted on another of said sections, so that, when said latch members of one section are disengaged from those of another, said baffle is positioned across a path of light rays leading to said film material and, when said latch members are mutually engaged, said baffle is removed from said path, permitting the exposure of said material, each said movable latch member being slidably mounted for vertical movement and spring-biased upwardly and including an elongated portion terminating in a tip having two oppositely-angled planar surfaces, namely, a front and a rear surface leading downwardly therefrom, said latch member including an undercut slot extending downwardly from said rear planar surface which is adapted to receive and firmly hold said cross-bar of said clevis-type latch member, whereby during assembly of said sections, when said clevis-type cross-bar contacts said front planar surface of said elongated latch portion during joining of said sections and passes across said tip thereof, said latch member is forced downwardly against said spring bias, and when said clevis cross-bar has passed across said tip to said rear planar surface said latch member moves upwardly under said spring bias and said fixed and movable latch members are preliminarily engaged so as to hold the camera sections with which they are incorporated against an inadvertent separation.

2. A camera, as defined in claim 1, wherein said latching and film-protective means includes a mechanism holding said means against further movement excepting when a camera section carrying said means is completely joined with another camera section, the latter including means engaging said holding mechanism to which the latter is so responsive as to relinquish its holding function.

3. A camera, as defined in claim 2, wherein, when said holding mechanism holds said latching and film-protecting means against movement, said baffle is positioned across said path of light rays.

4. A camera, as defined in claim 3, wherein said interlocking means of a given section includes a manually-actuable-rotatable shaft with a spring-biased pin protruding radially therefrom adapted to enter a first end of an aperture formed in a fixed overlying surface of said camera section carrying said interlocking means when said pin and aperture are aligned and thereby to prevent rotation of said shaft, and wherein another section to be joined with said section includes a fixed pin protruding from a surface to be joined, said fixed pin being adapted to enter an opposite end of said aperture and, when the sections are completely joined, to force said spring-biased pin completely out of said aperture, thus permitting rotation of said interlocking shaft.

5. A latching and interlocking pivotal baffle mechanism for incorporation with at least one of a plurality of interchangeable housing sections of a multisectional camera to insure the positioning of said baffle in light-shielding relation to photosensitive film materials carried by said camera whenever said sections are disassembled, and for removal from such a position when said sections are reassembled, said mechanism of a given housing section comprising a manually-rotatable shaft extending transversely of said section, cam means fixedly-mounted on said shaft, a latch member including a cam-follower, said latch member being slidably-mounted adjacent to said cam for actuation thereby and adapted to engage a fixed latch member of another housing section when joined thereto, a baffle pivotally-mounted for alternative obstruction of and removal from an open face of said given section, means fixedly-mounted on said shaft for actuating pivotal movement of said baffle, and latching means incorporated with said shaft and given section, responsive to release means of said other section when contacted thereby, said last-named latching means being in engaging and locking relation with one another when said baffle is positioned for obstruction of said face with said section separated from said other section, and being released from said engaging and locking relation when said section is joined to said other section, whereby said shaft can be manually rotated for effecting removal of said baffle from said open face.

References Cited by the Examiner
UNITED STATES PATENTS
2,868,096   1/1959   Rothfjell _____ 95—11

JOHN M. HORAN, *Primary Examiner.*